United States Patent
Zou et al.

(10) Patent No.: US 11,188,097 B1
(45) Date of Patent: Nov. 30, 2021

(54) TRAFFIC CONTROL FOR A SORT CENTER

(71) Applicant: Amazon Technologies, Inc., Seattle, WA (US)

(72) Inventors: Le Zou, Cambridge, MA (US); Scott C. McLeod, Chelmsford, MA (US); James Plumley, Pelham, NH (US); William Schneller, North Billerica, MA (US)

(73) Assignee: Amazon Technologies, Inc., Seattle, WA (US)

( * ) Notice: Subject to any disclaimer, the term of this patent is extended or adjusted under 35 U.S.C. 154(b) by 543 days.

(21) Appl. No.: 15/968,967

(22) Filed: May 2, 2018

(51) Int. Cl.
*G05D 1/02* (2020.01)
*B65G 47/90* (2006.01)

(52) U.S. Cl.
CPC ......... *G05D 1/0291* (2013.01); *B65G 47/905* (2013.01); *B65G 2203/0283* (2013.01); *G05D 2201/0216* (2013.01)

(58) Field of Classification Search
CPC ......... G05D 1/0291; G05D 2201/0216; B65G 47/905; B65G 2203/0283
See application file for complete search history.

(56) References Cited

U.S. PATENT DOCUMENTS

| 11,024,179 | B1 * | 6/2021 | Zou | G05D 1/0291 |
| 2008/0001372 | A1 * | 1/2008 | Hoffman | G05D 1/0297 280/35 |
| 2011/0093134 | A1 * | 4/2011 | Emanuel | G05D 1/0297 701/2 |
| 2014/0278029 | A1 * | 9/2014 | Tonguz | G08G 1/087 701/117 |
| 2016/0129592 | A1 * | 5/2016 | Saboo | G05D 1/0297 700/248 |
| 2019/0033882 | A1 * | 1/2019 | Collett | G05D 1/0289 |
| 2019/0196500 | A1 * | 6/2019 | Harasaki | G05D 1/0268 |

OTHER PUBLICATIONS

Z. Zhang, Q. Guo, J. Chen and P. Yuan, "Collision-Free Route Planning for Multiple AGVs in an Automated Warehouse Based on Collision Classification," in IEEE Access, vol. 6, pp. 26022-26035, 2018, doi: 10.1109/ACCESS.2018.2819199. (Year: 2018).*

* cited by examiner

*Primary Examiner* — Jeff A Burke
*Assistant Examiner* — Joshua Alexander Garza
(74) *Attorney, Agent, or Firm* — BakerHostetler

(57) ABSTRACT

A traffic control system that controls mobile drive unit traffic within a facility by segmenting the map into smaller traffic control policy areas and controlling access to those traffic control policy areas in response to travel requests from mobile drive units.

20 Claims, 9 Drawing Sheets

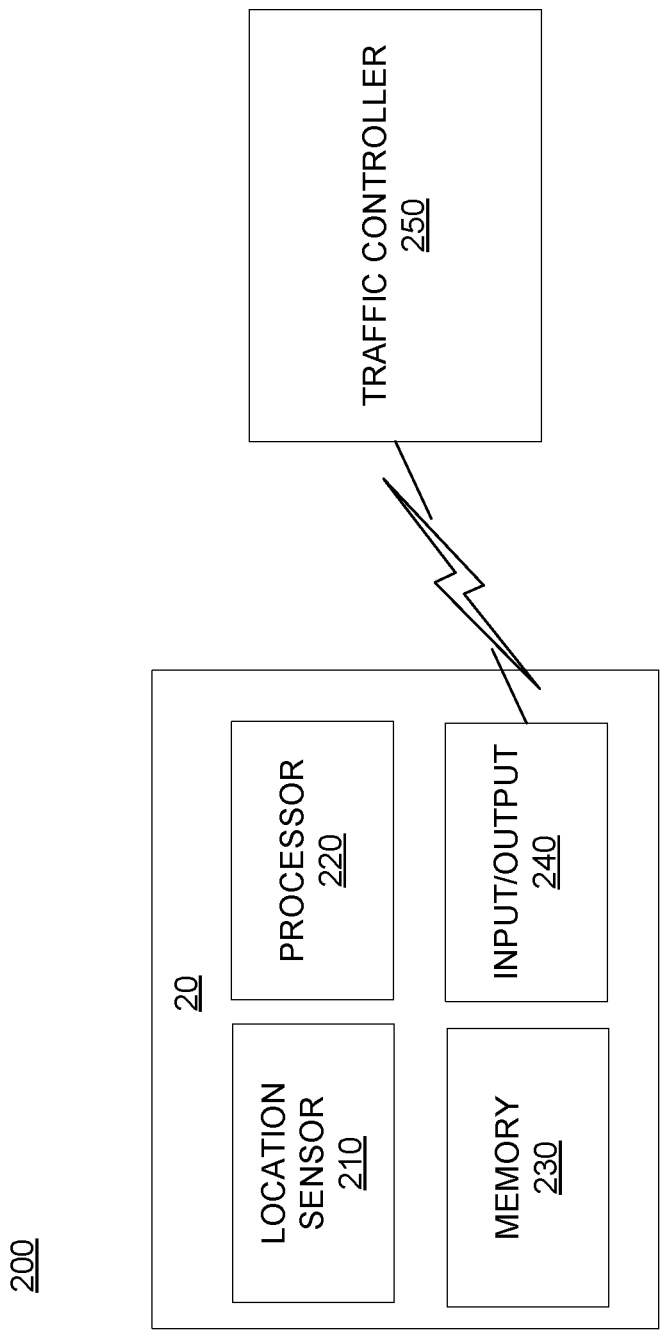

US 11,188,097 B1

TRAFFIC CONTROL FOR A SORT CENTER

BACKGROUND

The invention relates to robotic devices and methods, and more particularly to controlling traffic of robotic devices within a sort center.

Movement of products in a modern warehouse environment, such as a package sort center, in which packages are moved within a facility, occurs on a vast scale. One means to sort packages (i.e., payloads) is to use mobile drive units to deliver packages to destinations designated by the ultimate final destination of the package. For example, mobile drive units can be used to organize packages based on delivery route, as determined based on a postal code or other package features. Mobile drive units are self-powered robotic devices that travel on the floor of the warehouse guided by, for example, fiducial markers in or on the floor. In this manner, mobile drive units may follow a grid-like pattern to traverse from a starting point to a destination point, such as a drop-off location for a package.

When multiple mobile drive units are driving in the same area, or "swarm," traffic congestion occurs. As mobile drive units frequently stop and unload packages at ejection points, they will block their following mobile drive units from moving forward. In current systems, mobile drive units are allowed to take the available space ahead aggressively. As a result, intersections are occupied by the drives that could stay stationary for a few seconds. Given the high traffic throughput and the mobile drive unit density, one such stationary mobile drive unit can quickly turn a blocked intersection into a congestion cluster.

BRIEF DESCRIPTION OF THE DRAWINGS

FIG. 2 is a block diagram of a traffic control subsystem of a mobile drive unit and a remote traffic controller;

DETAILED DESCRIPTION OF ILLUSTRATIVE EMBODIMENTS

A mobile drive unit ("MDU") 8 includes a chassis assembly 10 of a vehicle, such as an autonomous or semi-autonomous robot, that supports a payload housing 12, capable of carrying a package (or other payload) in a sort center. The term "payload" is used herein to refer to any item typically moved in commerce, including but not limited to items to be packed for delivery, boxes, envelopes (such as jiffy mailers or bubble packs), and the like.

Figure 1A:
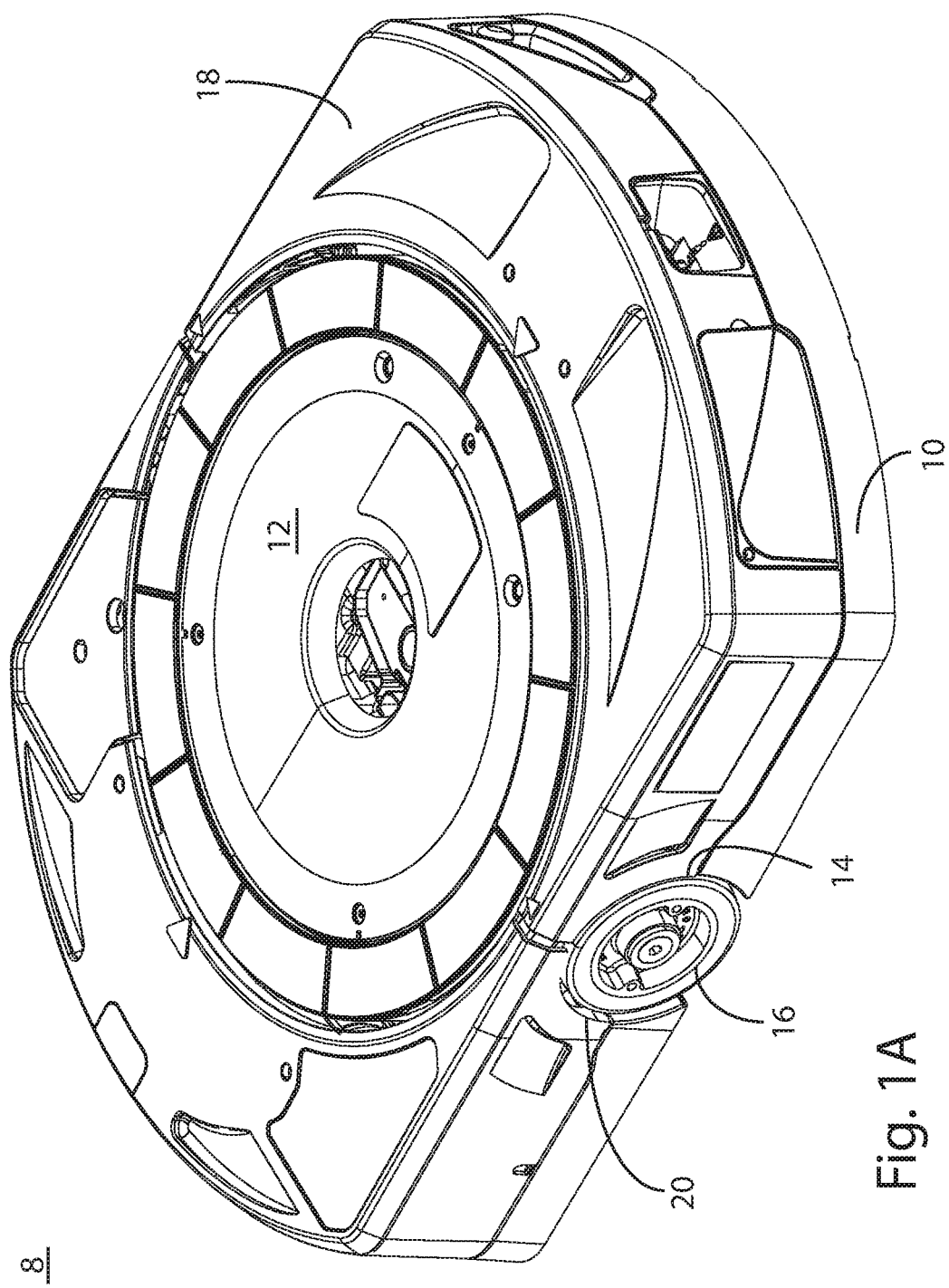
FIG. 1A is a perspective view of a mobile drive unit.

According to the embodiments shown in FIG. 1A, chassis 10 includes a pair of motorized wheel assemblies 14. Each motor assembly 14 includes a conventional motor (as will be understood by persons familiar with mobile drive unit technology) and a drive wheel 16. Wheels 16 are approximately at the midpoint (fore and aft) of mobile drive unit 10. Each wheel 16 may be driven according to control signals to move unit 10 forward or backward, or a direction of one of the wheels 16 can be reversed such that the drive unit 10 can rotate in place. Optionally, chassis also includes one or more casters (not shown).

Mobile drive unit 10 can include a cover 18 that is affixed to chassis 10. Cover 18 may have cut-out portions that form wheel cut-outs for wheels 16 extend through. In this regard, wheels 16 may extend laterally to the outboard sides of mobile drive unit 10.

Figure 1B:
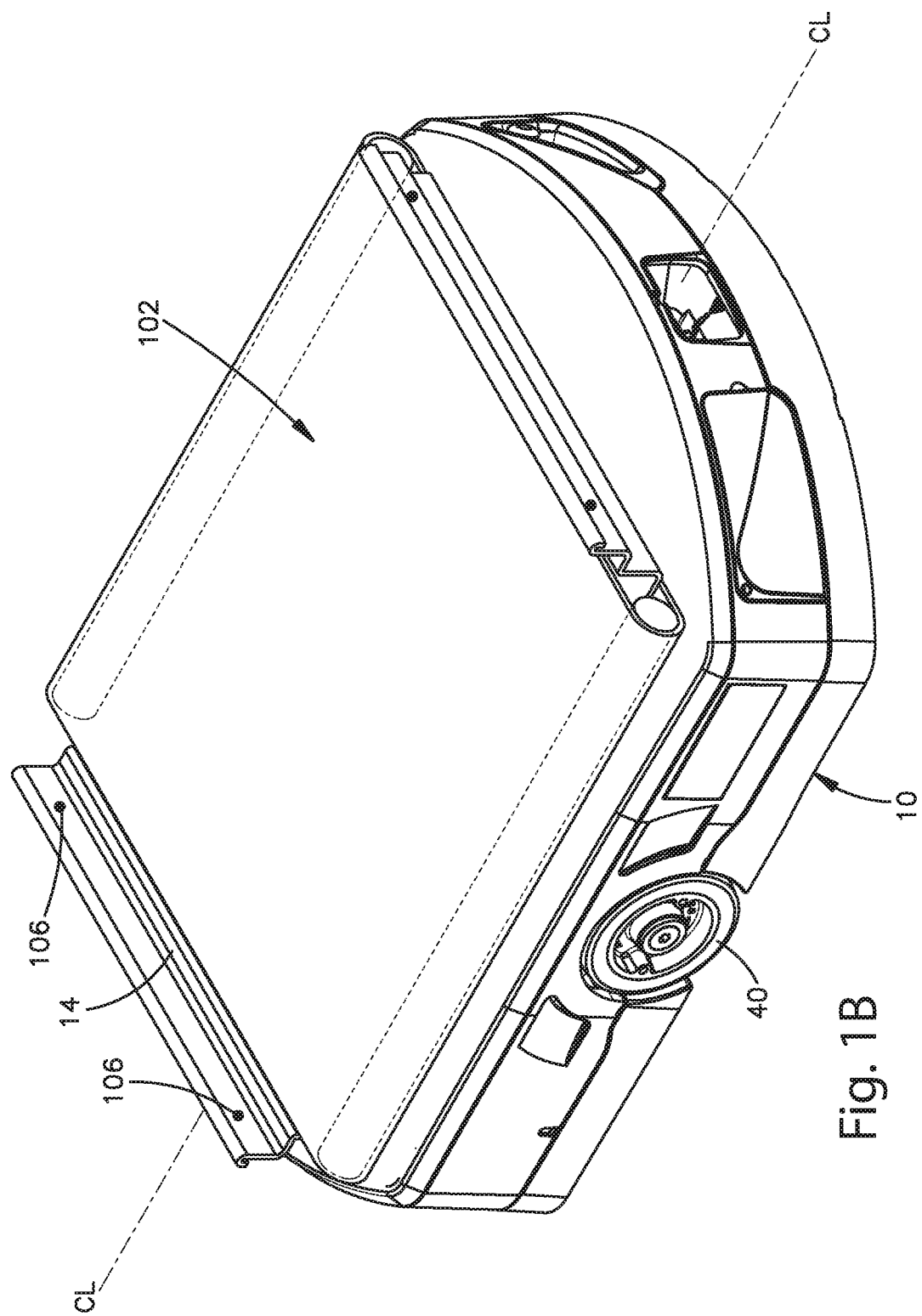
FIG. 1B is a perspective view of a mobile drive unit.

FIG. 1B illustrates an alternative embodiment of mobile drive unit 10. Instead of (or in addition to) the turntable shown in FIG. 1A, payload housing 12 can include a conveyor system. This system can include a conveyor belt 102 operated through the use of pulleys and/or motors. For example, control of conveyor belt 102 may be based on sensor data from sensors 106 that can be used to detect the presence and/or location of payloads on conveyor belt 102. Optionally, conveyor belt 102 may be sandwiched between sidewalls 14 that can prevent payloads from falling off the side of conveyor belt 102 during transport.

The traffic control technology disclosed herein is not limited to any particular design of mobile drive unit 10. Mobile drive unit 10 includes controllers, cameras and other sensors, a docking port, a turntable, motors to lift and rotate the turntable, and the other components. A person familiar with mobile drive unit technology will understand how to mount and employ the additional components to the chassis disclosed herein according to the particular goals and design of the mobile drive unit application.

For example, mobile drive unit 10 includes a traffic control subsystem 20 communicatively coupled to wheel assemblies 14 for controlling movement of mobile drive unit 10 in such a manner that account for other traffic in the vicinity of mobile drive unit 10. Traffic control subsystem 20 is discussed in more detail with reference to FIG. 2

FIG. 2 illustrates a traffic system 200, including a traffic control subsystem 20 (of mobile drive unit 10) and an external traffic controller 250, which can communicate with a plurality of traffic control subsystems 20. Traffic control subsystem 20 is one subsystem that controls the locomotion of mobile drive unit 10. Traffic control subsystem 20 operates by communicating with traffic controller 250, providing location information of mobile drive unit 10 and receiving traffic information and/or commands from traffic controller 250. For example, traffic controller 250 may provide traffic information to traffic control subsystem 20 so that traffic control subsystem 20 can make locomotion decisions based on traffic in the vicinity of mobile drive unit 10. Additionally or alternatively, traffic controller 250 may provide locomotion commands for traffic control subsystem 20 to execute. Depending on design limitations and processing demands, different implementations may have traffic controller 250 making the locomotion decisions based on traffic data collected from mobile drive unit 10 and other drive units, or may have traffic control subsystem 20 making such decisions based on traffic data transmitted by traffic controller 250. For clarity, when referring to traffic control in general, this disclosure refers to the operations as being performed generally by traffic system 200, which includes the operations being performed by traffic control subsystem 20, traffic controller 250, or any combination thereof.

Traffic control subsystem 20 includes a location sensor 210 for detecting the location of mobile drive unit 10. This may be done in a variety of ways, including one or more indoor positioning techniques. For example, location sensor 210 may detect the presence and identifier of a fiducial within a vicinity of mobile drive unit 10. In one implementation, fiducials may be placed at specific locations on a floor of the sortation center, and location sensor 210 may be positioned to detect or read a fiducial as mobile drive unit 10 drives or stands over that fiducial.

Traffic controller subsystem 20 may communicate with other subsystems of mobile drive unit for location purposes, such as acceleration control systems, obstacle avoidance systems, payload monitoring systems, and the like. That is, traffic control subsystem 20 may work with other subsystems to drive mobile drive unit 10.

Location sensor 210 may be communicatively coupled to a processor 220 and a memory 230 of traffic controller subsystem 20. Memory 230 stores instructions that causes processor 220 to effectuate operations, which may include operations for driving mobile drive unit 10 and communication (within and outside of mobile drive unit 10). For example, processor 220 may be communicatively coupled to an input/output 240 of traffic controller subsystem 20. Input/output 240 may be configured to communicate with traffic controller 250, or other systems.

Figure 3:
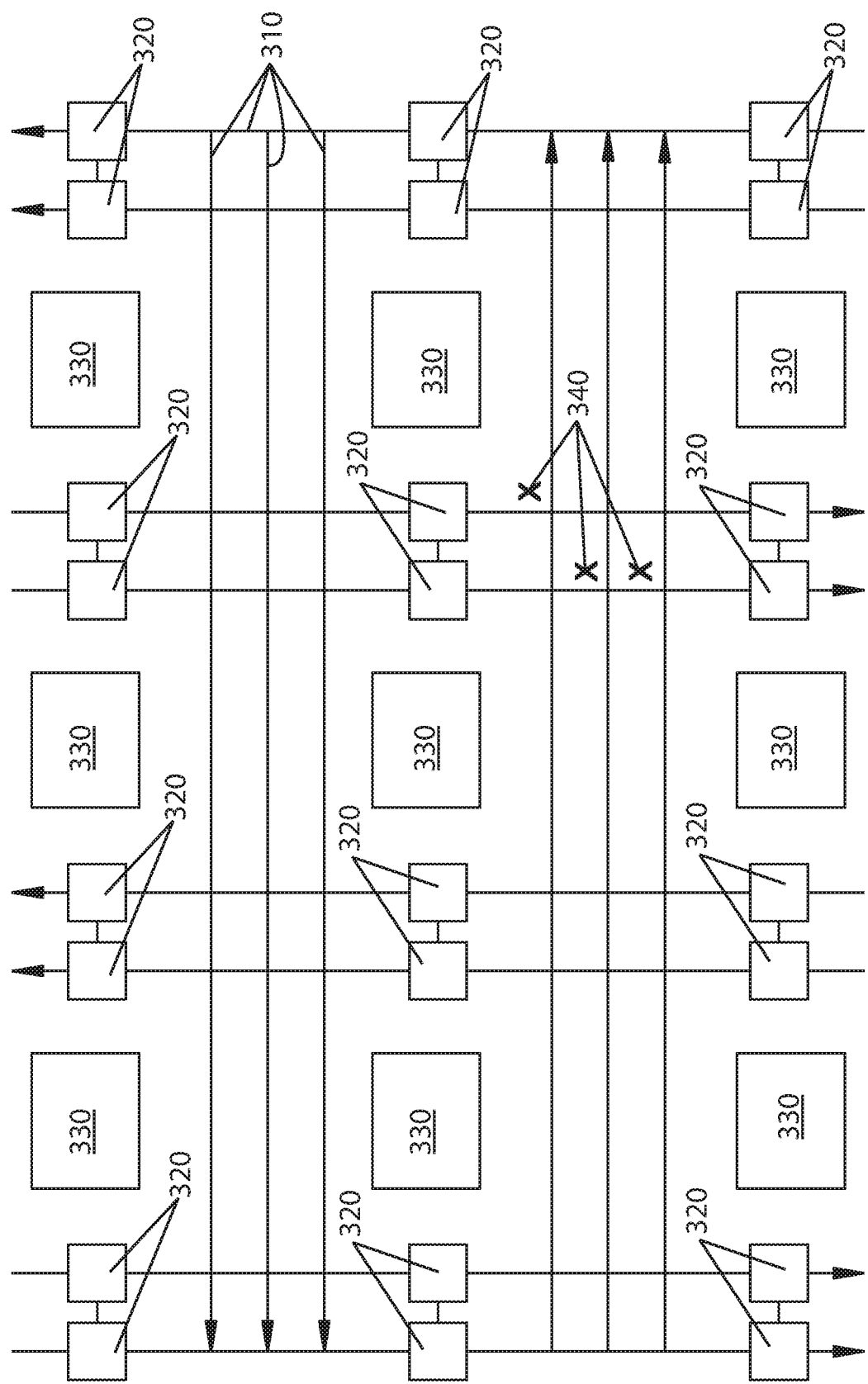
FIG. 3 is a block diagram of an exemplary traffic pattern for mobile drive units in a facility.

FIG. 3 is a floor map 300 of a traffic pattern for mobile drive units 10 in a facility, such as a sortation center. Map 300 includes a plurality of travel lanes 310 along which mobile drive units 10 can travel. As map 300 illustrates, travel lanes 310 include perpendicular, intersecting lanes 310, as well as series of parallel lanes 310. This allows mobile drive units 10 to reach different ejection points 320 by traveling in straight lines and, optionally, making 90 degree turns. Ejection points 320 are strategically positioned alongside chutes 330, into which mobile drive units 10 can eject or unload their payloads. While map 300 shows only (parallel and perpendicular) travel lanes 310, ejection points 320, and chutes 330, a more complete map of a facility may include other configurations and other elements, including obstacles, mobile drive unit loading mechanisms, or the like. That is, a configuration of a facility is not limited to what is shown in floor map 300. Fiducials may be spaced along travel lanes 310. For example, each intersection of any two travel lanes 310 may be marked by a fiducial 340, illustrated by exemplary "X" at sample intersections.

Figure 4:
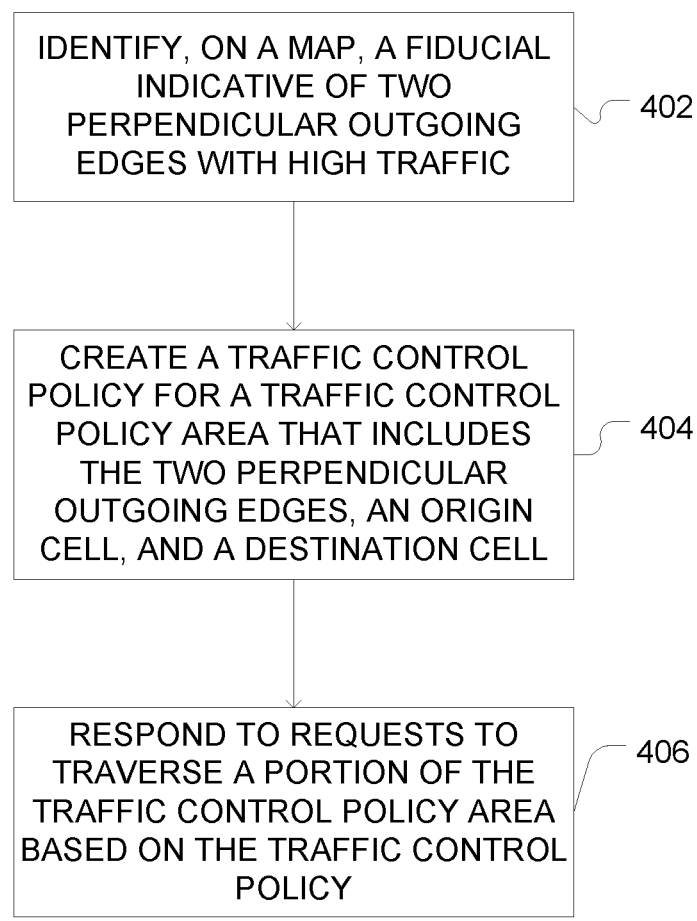
FIG. 4 is a flowchart of an exemplary method of creating a traffic control policy for a facility.

FIG. 4 illustrates an exemplary method 400 for creating a traffic control policy for a facility (e.g., for a floor or subsection of a floor of a facility). At a high level, method 400 includes breaking up the facility into smaller sections, identifying which of those sections have high traffic, then, for each of those high-traffic sections, creating a policy that controls how to respond to traffic requests to traverse those smaller sections. In this manner, traffic control over a larger section can be handled on smaller, more manageable sections.

At step 402, method 400 includes identifying, on a map, a fiducial 340 indicative of two perpendicular outgoing edges. As discussed above, and as shown in FIG. 3, the map may use fiducials 340 to identify intersections of travel lanes 310. Further, travel lanes 310 may each comprise a single lane through which one-way traffic is permitted to travel. FIG. 3 uses arrows to indicate the direction of travel for each lane 310. Thus, each fiducial 340 (at least those illustrated in FIG. 3) identify an intersection of travel lanes 310 that includes two incoming edges (those portions of travel lanes 310 in which traffic is to flow into the intersection) and two outgoing edges (those portions of travel lanes 310 in which traffic is to flow out of the intersection).

In some embodiments, controlling traffic for a facility may include creating traffic control policies that encompass every intersection. However, in other circumstances, such as those in which traffic is not evenly distributed across every intersection, traffic may be controlled by creating traffic control policies for less than all of the intersections. For example, controlling traffic may include identifying those fiducials 340 having two outgoing edges (portions of travel lanes 310) that have high traffic. High traffic may be defined in any manner, such as based on the throughput of mobile drive units 10, the percentage of time in which those portions of travel lanes 310 are occupied (either by moving or stationary mobile drive units 10), or any other metric.

Figure 5:
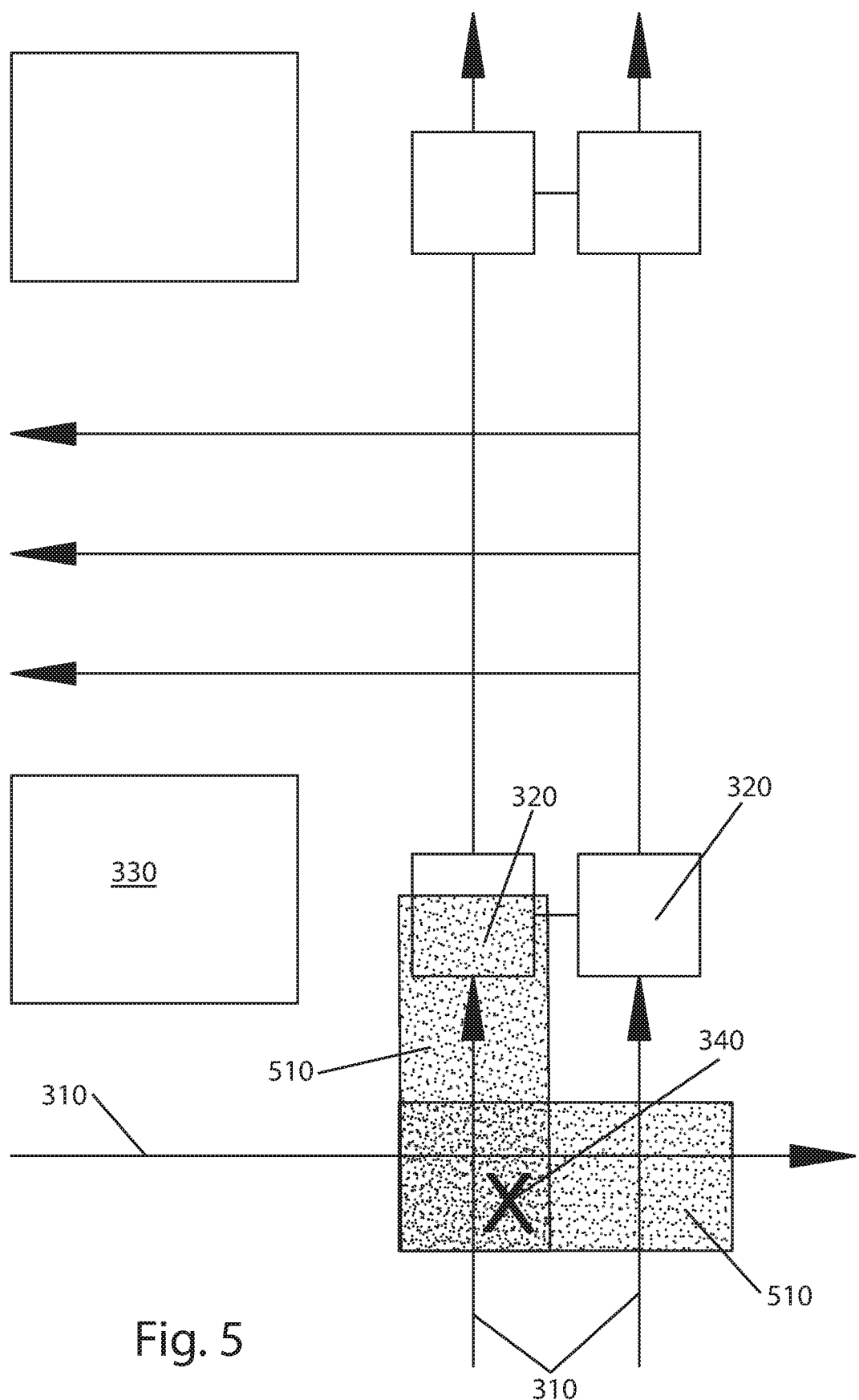
FIG. 5 is a diagram of overlapping traffic control policy areas for a facility.

Regardless of the manner in which such fiducials 340 are identified, a traffic control policy area 510 is defined to include both outgoing perpendicular edges associated with that fiducial 340. Thus, there will be two overlapped traffic control policy regions generated as a "L" shape at each fiducial 350. FIG. 5 illustrates two exemplary traffic control policy areas 510. The traffic control policy includes a series of rules that dictate whether a travel request to traverse a portion of the travel.

An aspect of traffic control policy areas 510 is that they are directional. Which means, if mobile drive unit 10 is traveling perpendicular to the direction of the traffic control policy area 510, then that policy associated with that policy area 510 does not restrict travel of mobile drive unit 10. For example, if a mobile drive unit 10 is requesting to travel east-west along the horizontal travel lane 310, which would include traversing through the intersection associated with fiducial 340, as shown in FIG. 5, then this request to travel, while traversing a portion of the vertical traffic control policy area 510 (that extends north-south to overlap with ejection point 320), would not implicate the policy associated with that traffic control policy area 310. Rather, the east-west travel request would implicate the policy associated with the horizontal traffic control policy area 510.

Thus, in determining whether a traffic control policy applies to a travel request, consideration may be made of the directionality of both traffic control policy area 510 and the directionality of travel. This can be done by, for example, comparing a start point and ending point of the travel request and the origin cell and destination cell of traffic control policy area 510. For example, a determination that the travel request is to traverse both the origin cell and the destination cell could be indicative that the directionality of traffic control policy area 510 is in line with the travel request, such that the traffic control policy of that area 510 applies.

Figure 6:
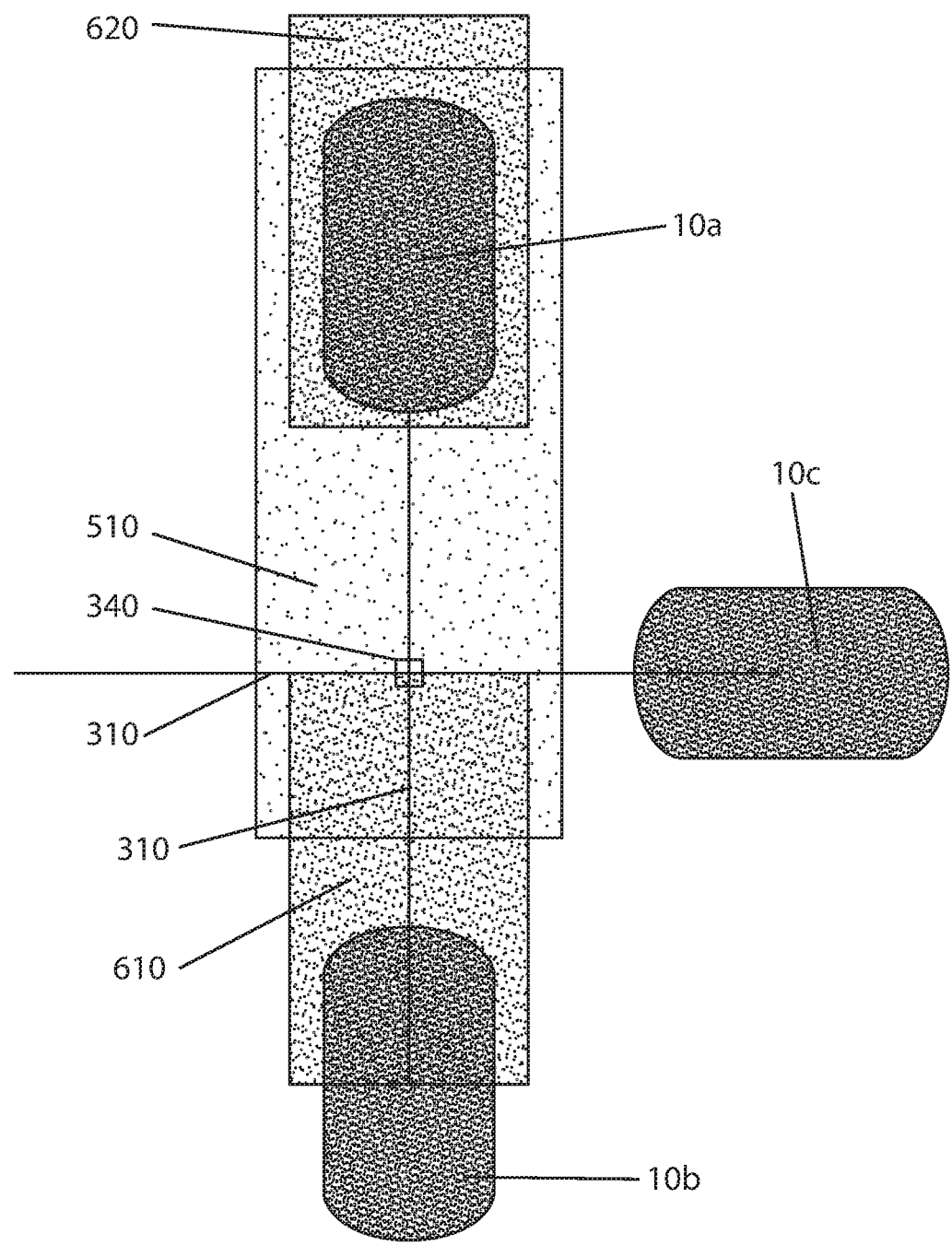
FIG. 6 is a diagram of mobile drive units interacting at a traffic control policy area.

FIG. 6 illustrates two effects of a traffic control policy: First, as discussed above, a traffic control policy will not restrict travel of a mobile drive unit moving perpendicular to the direction of travel of its traffic control policy area 510. For example, a travel request from mobile drive unit 10c to drive along travel lane 310, intersecting traffic control policy area 510, will not be denied or delayed based on the traffic control policy of area 510. (Of course, other traffic control policy areas 510 whose direction aligns with the travel request direction may be implicated.)

Travel request to travel along the direction of travel of traffic control policy area 510 must comply with that area's policy. For example, a travel request from mobile drive unit 10b that to travel along traffic control policy area 510, as shown by the overlap of travel request area 610 and traffic control policy area 510, will not be granted if there is already another mobile drive unit 10a in traffic control policy area 510 that does not have enough running room. Running room may be the area around mobile drive unit 10, and may be limited to the area mobile drive unit 10 would have to operate if another mobile drive unit 10 were granted permission to enter or traverse traffic control area 510.

A sufficient running room may be a buffer area around mobile drive unit 10b, such as illustrated in FIG. 6 as 620, whose size may be determined based on a number of factors, such as the amount of space mobile drive unit 10b needs to make a planned movement (e.g., direction change), the direction of travel of mobile drive unit 10b, the speed of mobile drive unit 10b, or other factors. For example, running room 620 may be used as an indicator as to whether another mobile drive unit 10a will need to slow down as a result of the proximity of mobile drive unit 10b to the projected route of mobile drive unit 10a. This rule is designed to prevent a stationary mobile drive unit 10 from sitting at the intersection that blocks potential crossing traffic.

Otherwise, as shown in FIG. 6, with enough running room 620, under the assumption that mobile drive unit 10a is going to update its position and release running room 620 shortly, travel request from mobile drive unit 10b can be granted. This rule of the particular traffic control policy covering traffic control policy area 510, in conjunction with the same rule at play in other traffic control policy areas 510, essentially acts to prevent injecting more traffic into the facility than it can support.

When a travel request is not granted, it may be delayed. In this manner, traffic control system 200 may either delay responding to the travel request or indicate that the travel request should be resubmitted after a period of time elapses. Traffic control policy can include other rules for handling travel requests. For example, another rule is to delay a travel request if there is already another mobile drive unit 10 in the travel lane 510 intersection covered by traffic control policy area 510a. This could include delaying a travel request until the other mobile drive unit 10 leaves traffic control policy area 510a, completes a turn, or has enough running room.

Additionally or alternatively, traffic control system 200 may implement a request timeout, that may trigger other activity, if a travel request is delayed for a certain amount of time. This may include, for example, causing mobile drive unit 10 to reroute.

Figure 7:
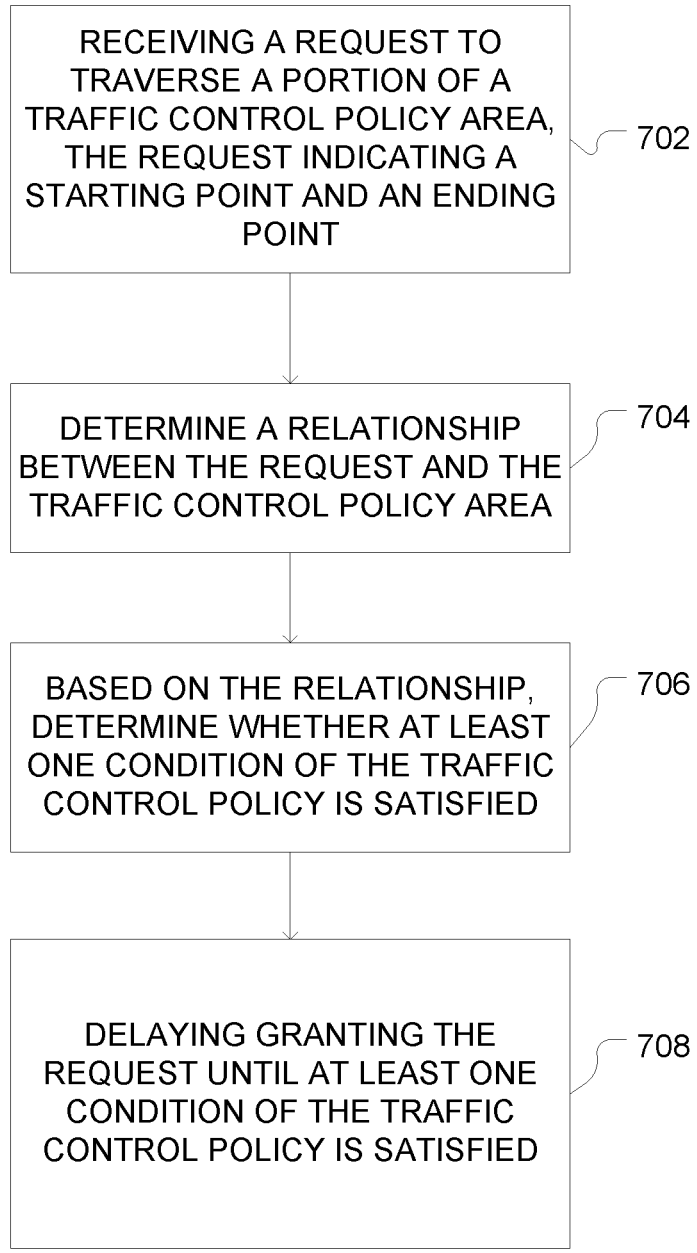
FIG. 7 is a flowchart of an exemplary method for handling requests to traverse a traffic control policy area.

FIG. 7 is a flowchart of an exemplary method 700 for handling requests to traverse traffic control policy area 510. At a high level, method 700 includes determining the scope of the request, and granting the request only when at the traffic control policy implicated by the request is satisfied.

At step 702, method 700 includes receiving, from first mobile drive unit 10b, a request to traverse a portion of traffic control policy area 510. The request may indicate a starting point and an ending point of the planned or requested movement of first mobile drive unit 10b. For example, the starting point and ending point may be indicated by request area 610, where the starting point is the current location of mobile drive unit 10b. Step 702 may include identifying one (or more) traffic control policies implicated by the request. This can be done based upon identifying which traffic control policy area(s) 510 overlap with the route indicated by the request.

At step 704, method 700 includes comparing the starting point and the ending point to the origin cell and the destination cell of traffic control policy area 510 to determine a relationship between the request and traffic control policy area 510. For example, in FIG. 6, request area 610 indicates that mobile drive unit 10b is requesting to enter traffic control policy area 510 along a direction of travel (up-down) of travel lane 310. As another example, if the request is from mobile drive unit 10c to travel along travel lane 310 toward the left of FIG. 6, then the request would be to traverse a portion of traffic control area 510 perpendicular to the direction of travel (up-down) of traffic control area 510.

At step 706, method 700 includes determining whether at least one condition of the traffic control policy is satisfied based on the relationship between the request and traffic control policy area 510. That a condition is satisfied may be indicative that mobile drive unit 10 can enter or traverse traffic control policy area 510 without disrupting other traffic, based on that other traffic's granted travel requests. More specifically, that a condition is satisfied may indicate that mobile drive unit 10 can enter or traverse traffic control policy area 510 without needing to sit stationary within the intersection covered by traffic control policy area 510.

For example, a condition of the traffic control policy can be satisfied based on the request being to traverse traffic control policy area 510 perpendicular to the direction of traffic flow of traffic control policy area 510. That is, while traffic control policy area 510 in FIG. 6 covers both a horizontal travel lane 310 and a vertical travel lane 310, the direction of travel of traffic control policy area 510 is the direction of travel of traffic that flows from the origin cell to the destination cell of traffic control policy area 510—that is, vertical. Thus, a condition of traffic control policy controlling traffic control policy area 510 is satisfied by a request from mobile drive unit 10a to drive horizontally across traffic control policy area 510.

This circumstance—where the request is not to travel in the same direction as that associated with traffic control policy area 510—can indicate that that traffic control policy does not restrict the travel request. There could be other circumstances, such as when the travel request would also traverse an overlapping traffic control policy area 510, in which traffic system 200 may otherwise restrict or delay travel.

As another example, a condition of the traffic control policy can be satisfied if no other mobile drive units 10 are located within traffic control policy area 510. More specifically, the condition may require that no other mobile drive units 10 have been permitted to enter into traffic control policy area 510 that have not yet completed this permitted movement. Thus, determining whether a traffic control policy is satisfied can comprise determining that approved routes of other mobile drive units 10 do not intersect traffic control policy area 510.

The conditions regarding other mobile drive units 10 within traffic control policy area 510 may be more nuanced. For example, a condition may be satisfied once mobile drive unit 10 completes a planned rotation within traffic control policy area 510. This may be based on other elements also being present, such as sufficient running room for mobile drive unit 10 that has finished rotating. As another example, a condition may be satisfied once mobile drive unit 10—once stationary—has begun moving again. Again, this may be based on other elements also being present, such as sufficient running room for mobile drive unit 10 that has started moving after being stationary. As yet another example, a condition of traffic control policy may be satisfied, though another mobile drive unit 10 is already present in traffic control policy area, if that mobile drive unit 10 has sufficient running room to make a planned movement, or if mobile drive unit 10 will exit traffic control policy area 510 prior to the mobile drive unit 10 requesting to enter traffic control policy area 510 will enter traffic control policy area 510.

In instances where the request implicates multiple traffic control policy areas 510 (e.g., such as when a request is to traverse the overlapping portion of two traffic control policy areas), method 700 may include confirming that each of the implicated traffic control policies have at least one condition satisfied prior to granting the request (e.g., repeating steps 704-708 for each implicated traffic control policy).

In instances in which no condition of traffic control policy is satisfied, method 700 may include delaying the request until a condition of traffic control policy is satisfied. For example, if another mobile drive unit 10 in traffic control policy area 510 does not have sufficient running room (or will not have sufficient running room if the request is granted) granting the request may be delayed until granting the request would not cause mobile drive unit 10 already in traffic control policy area 510 to have insufficient running room. In the meantime, traffic control system 200 may field other requests from other mobile drive units 10, including requests to traverse the same traffic control policy area 510.

Figure 8:
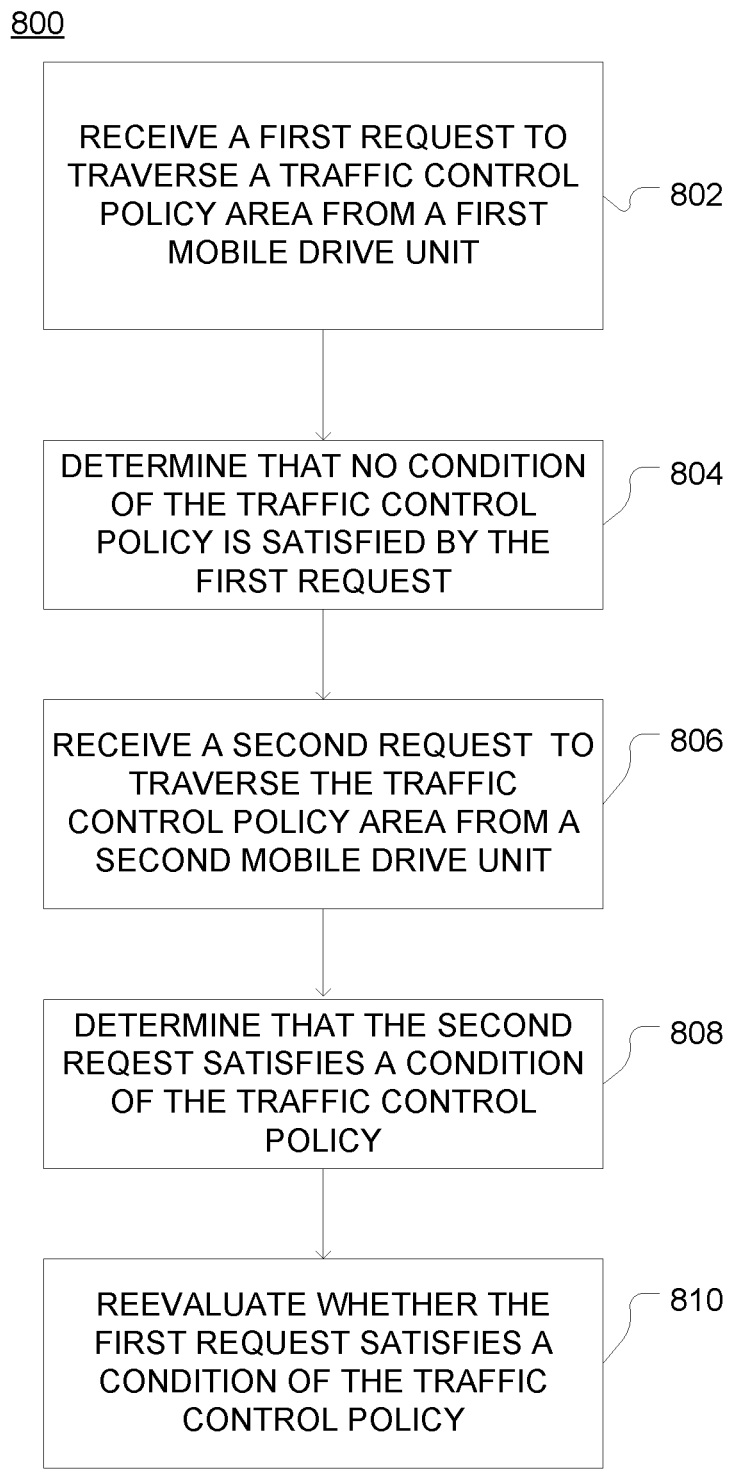
FIG. 8 is a flowchart of an exemplary method for handling multiple requests from multiple mobile drive units to traverse the same traffic control policy area.

FIG. 8 is a flowchart of an exemplary method 800 for handling multiple requests from multiple mobile drive units to traverse the same traffic control policy area.

At step 802, method 800 includes receiving a first request to traverse traffic control policy area 510 from first mobile drive unit 10*a*. At step 804, method 800 may include determining that no condition of traffic control policy controlling traffic control policy area 510 is satisfied by the first request. Thus, method 800 may include delaying granting the first request until it satisfies at least one condition of traffic control policy.

In the meantime, traffic control system 200 may move on to evaluate a second request to traverse traffic control policy area 510, which was received from second mobile drive unit 10*b* at step 806. At step 808, method 800 may include determining that second request satisfies at least one condition of the traffic control policy. If traffic control system 200 concludes that this is true, then at step 808, method 800 may include granting second request. This may mean granting second request prior to granting first request.

The circumstances in which a subsequent request may be granted prior to granting an earlier received request can depend upon the status of traffic control policy area 510 and the scope of the requests. For example, first request to travel along the traffic flow of traffic control policy area 510 may be blocked by a stationary mobile drive unit 10*c*. Second request may be for mobile drive unit 10*c* to traverse perpendicular to the direction of travel of traffic control policy area 510.

Once second request is granted, step 810 may include reevaluating whether first request satisfies a condition of the traffic control policy. This method may repeat until the earliest received request has been granted, then continue on to evaluate subsequent requests.

The present invention has been described by employing a particular embodiment to illustrate particular features. For merely one non-limiting example, components are referred to as front and rear in order to illustrate the structure and function, but the invention is not limited to the particular front and rear orientations unless expressly stated in the claims. Further, the present invention is not limited to any structure or function, nor is the invention limited to any solution to any problem, described herein unless expressly stated in the claims. Nor is the invention limited in any way to embodying a benefit unless expressly stated in the claims. Rather, the structure and function described herein is merely an illustration, and the claims are intended to receive their full scope.

What is claimed is:

1. A traffic system for controlling traffic of a plurality of mobile drive units including a first mobile drive unit and other mobile drive units, the traffic system comprising:
   a controller in communication with the mobile drive units;
   memory storing instructions that cause the controller to effectuate operations, the operations comprising:
      identifying, on a floor map, a fiducial indicative of intersecting travel lanes for the mobile drive units;
      determining a traffic control policy for a traffic control policy area that includes the intersecting travel lanes, an origin cell, and a destination cell based on a directionality of the mobile drive units traversing the traffic control policy area;
      receiving, from the first mobile drive unit, a request to traverse at least a portion of the traffic control policy area, the request indicating a starting point and an ending point;
      comparing the starting point and the ending point to the origin cell and the destination cell to determine a relationship between the request and the traffic control policy area;
      based on the relationship, determining whether any approved routes of the other mobile drive units intersect the traffic control policy area or whether the request is to travel perpendicular to a traffic flow of the portion of the traffic control policy area;
      granting the request if none of the approved routes of the other mobile drive units intersect the traffic control policy area or if the request is to travel perpendicular to the traffic flow; and
      delaying the request if any of the approved routes of the other mobile drive units intersect the traffic control policy area or if the request is not to travel perpendicular to the traffic flow.

2. The traffic system of claim 1, wherein delaying the request is based on a second mobile drive unit of the other mobile drive units rotating within the traffic control policy area.

3. The traffic system of claim 1, wherein delaying the request is based on a second mobile drive unit of the other mobile drive units within the traffic control policy area not having enough running room.

4. The traffic system of claim 1, wherein delaying the request is based on a second mobile drive unit of the other mobile drive units being stationary within the traffic control policy area.

5. The traffic system of claim 1, wherein the request is to travel perpendicular to the traffic flow and wherein the request is to traverse a second traffic control policy area, the operations further comprising:
   identifying a second traffic control policy area; and
   determining whether the approved routes intersect the second traffic control policy area,
   wherein granting the request is further based on none of the approved routes of the other mobile drive units intersecting the second traffic control policy area.

6. The traffic system of claim 1, wherein the fiducial is associated with high traffic based on usage of the travel lanes.

7. A method comprising:
   receiving, from a mobile drive unit, a request to travel from a starting point to an ending point;
   determining, based on the starting point and the ending point, a directionality of the mobile drive unit and that the mobile drive unit is requesting to traverse a portion of a traffic control policy area, the traffic control policy area comprising intersecting travel lanes;

identifying a traffic control policy for the traffic control policy area;

determining, based on the directionality of the mobile drive unit, that the request satisfies at least one condition of the traffic control policy; and granting, following the request satisfying the at least one condition of the traffic control policy, the request.

8. The method of claim 7, wherein determining that the request satisfies the at least one condition of the traffic control policy comprises determining that the request is to travel perpendicular to a traffic flow of the portion of the traffic control policy area.

9. The method of claim 7, wherein determining that the request satisfies the at least one condition of the traffic control policy comprises determining that approved routes of other mobile drive units do not intersect the traffic control policy area.

10. The method of claim 7, further comprising:
determining that a running room for a second mobile drive unit within the traffic control policy area is insufficient; and
delaying the request from the mobile drive unit until the running room of the second mobile drive unit is sufficient.

11. The method of claim 10, further comprising:
receiving, from a third mobile drive unit, a second travel request to intersect the traffic control policy area perpendicular to the traffic flow, the second travel request being received after the request is received from the mobile drive unit; and
granting the second travel request prior to granting the request.

12. The method of claim 7, further comprising:
determining that a second mobile drive unit is rotating within the traffic control policy area; and
delaying granting of the request until the second mobile drive unit finishes rotating.

13. The method of claim 7, further comprising:
determining that a second mobile drive unit is stationary within the traffic control policy area; and
delaying granting of the request until the second mobile drive unit is moving.

14. The method of claim 7, wherein the request also implicates a second traffic control policy area that partially overlaps with the traffic control policy area,
wherein the second traffic control policy area is associated with a second traffic control policy, and
wherein granting the request is further based on at least one second condition of the second traffic control policy being satisfied.

15. The method of claim 10, further comprising:
determining a planned movement of the second mobile drive unit; and
based on the planned movement, determining a sufficient running room for the second mobile drive unit,
wherein determining that the running room for the second mobile drive unit within the traffic control policy area is insufficient comprises comparing the running room to the sufficient running room.

16. The method of claim 10, further comprising:
following delaying the request from the mobile drive unit, determining that the running room for the second mobile drive unit within the traffic control policy area is sufficient; and
granting, based on determining that the running room for the second mobile drive unit within the traffic control policy area is sufficient, the request from the mobile drive unit.

17. A traffic control system, comprising:
a processor; and
memory storing instructions that cause the processor to effectuate operations, the operations comprising:
receiving a first request to travel across a traffic control policy area associated with a traffic control policy at a first time and a second request to travel across the traffic control policy area associated with the traffic control policy at a second time that is after the first time;
determining that the first request does not satisfy the traffic control policy;
delaying granting of the first request;
determining that the second request satisfies the traffic control policy;
granting the second received request; and
subsequent to completion of travel indicated by the second request, reevaluating the first request to determine if the first request satisfies the traffic control policy.

18. The system of claim 17, wherein the second request is to traverse a portion of the traffic control policy area perpendicular to a direction of travel of the portion of the traffic control policy area.

19. The system of claim 17, wherein determining that the first request does not satisfy the traffic control policy is based at least on a preexisting mobile drive unit being present in the traffic control policy area.

20. The system of claim 17, wherein determining that the first request does not satisfy the traffic control policy is based at least on a preexisting mobile drive unit present in the traffic control policy area not having sufficient running room.

* * * * *